United States Patent
Kamatani et al.

(10) Patent No.: US 10,486,688 B2
(45) Date of Patent: Nov. 26, 2019

(54) HYBRID VEHICLE

(71) Applicant: TOYOTA JIDOSHA KABUSHIKI KAISHA, Toyota-shi, Aichi-ken (JP)

(72) Inventors: Hideki Kamatani, Toyota (JP); Koji Hokoi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 18 days.

(21) Appl. No.: 15/882,018

(22) Filed: Jan. 29, 2018

(65) Prior Publication Data

US 2018/0265075 A1 Sep. 20, 2018

(30) Foreign Application Priority Data

Mar. 15, 2017 (JP) .................................. 2017-049985

(51) Int. Cl.
*F02D 41/30* (2006.01)
*B60W 20/16* (2016.01)
(Continued)

(52) U.S. Cl.
CPC ............ *B60W 20/16* (2016.01); *B60W 10/06* (2013.01); *F01N 3/101* (2013.01); *F01N 9/00* (2013.01); *F02D 41/024* (2013.01); *F02D 41/042* (2013.01); *F02D 41/1446* (2013.01); *F02D 41/1454* (2013.01); *B60W 2510/068* (2013.01);
(Continued)

(58) Field of Classification Search
CPC ................. B60W 20/16; B60W 10/06; B60W 2510/0619; B60W 2510/068; F01N 9/00; F01N 3/101; F01N 2430/06; F01N 2900/0422; F01N 2900/08; F01N 2900/1602; F01N 2590/11; F02D 41/042; F02D 41/1454; F02D 41/024; F02D 41/1446; F02D 41/065; F02D 2200/0804; F02D 2200/021; F02D 2200/0802; F02D 2041/0265; Y02T 10/47; Y02T 10/22; Y02T 10/26; Y02A 50/2324
USPC ........................ 123/672, 676, 299, 300, 481; 701/103–105, 112
See application file for complete search history.

(56) References Cited

U.S. PATENT DOCUMENTS 7,958,957 B2 * 6/2011 Suzuki ................ B60L 15/2045
180/65.265
8,011,178 B2 * 9/2011 Ikeda .................. B01D 53/9495
60/286
(Continued)

FOREIGN PATENT DOCUMENTS

| JP | 2004-176710 A | 6/2004 |
| JP | 2007-161209 A | 6/2007 |
| JP | 2014-213637 A | 11/2014 |

*Primary Examiner* — Hai H Huynh
(74) *Attorney, Agent, or Firm* — Sughrue Mion, PLLC

(57) ABSTRACT

When a temperature of a catalyst in an exhaust emission control device mounted in an exhaust system of an engine is equal to or higher than a predetermined temperature at a time of a request for stopping the engine, a hybrid vehicle including the engine and a motor continues fuel injection of the engine until satisfaction of a predetermined condition and stops fuel injection of the engine on satisfaction of the predetermined condition. When the temperature of the catalyst is lower than the predetermined temperature at the time of the request for stopping the engine, on the other hand, the hybrid vehicle immediately stops fuel injection of the engine.

5 Claims, 5 Drawing Sheets

(51) Int. Cl.
  *F02D 41/14* (2006.01)
  *B60W 10/06* (2006.01)
  *F01N 9/00* (2006.01)
  *F01N 3/10* (2006.01)
  *F02D 41/04* (2006.01)
  *F02D 41/02* (2006.01)
  *F02D 41/06* (2006.01)

(52) U.S. Cl.
  CPC .. *B60W 2510/0619* (2013.01); *F01N 2430/06* (2013.01); *F01N 2430/10* (2013.01); *F01N 2590/11* (2013.01); *F01N 2900/0422* (2013.01); *F01N 2900/08* (2013.01); *F01N 2900/1602* (2013.01); *F02D 41/065* (2013.01); *F02D 2041/0265* (2013.01); *F02D 2200/021* (2013.01); *F02D 2200/0802* (2013.01); *F02D 2200/0804* (2013.01); *Y02A 50/2324* (2018.01); *Y02T 10/22* (2013.01); *Y02T 10/26* (2013.01); *Y02T 10/47* (2013.01)

(56) References Cited

U.S. PATENT DOCUMENTS

| | | | |
|---|---|---|---|
| 8,549,845 B2 * | 10/2013 | Iwamoto | B01D 53/9495 60/286 |
| 8,594,872 B2 * | 11/2013 | Ichimoto | B60W 20/00 701/22 |
| 2004/0060535 A1 | 4/2004 | Osawa et al. | |
| 2011/0271918 A1 * | 11/2011 | Nishikiori | B60K 6/445 123/90.1 |
| 2016/0059863 A1 | 3/2016 | Kuwamoto et al. | |
| 2017/0082043 A1 * | 3/2017 | Dudar | F02D 41/0035 |
| 2018/0209363 A1 * | 7/2018 | Suzuki | F01N 3/101 |

* cited by examiner

HYBRID VEHICLE

CROSS-REFERENCE TO RELATED APPLICATION

This application claims priority to Japanese Patent Application No. 2017-049985 filed on Mar. 15, 2017, the contents of which is incorporated herein by reference.

TECHNICAL FIELD

The present disclosure relates to a hybrid vehicle.

BACKGROUND

In a proposed hybrid vehicle configured such that a carrier, a sun gear and a ring gear of a planetary gear are connected with an internal combustion engine, a first motor, and an axle coupled with drive wheels and that a second motor is connected with the axle, when operation of the internal combustion engine is stopped, the first motor outputs a torque in a direction of stopping rotation of the internal combustion engine (as described in, for example, JP2014-213637A).

CITATION LIST

Patent Literature

PTL 1: JP2014-213637A

SUMMARY

In the hybrid vehicle described above, when a catalyst in an exhaust emission control device mounted to an exhaust system of the internal combustion engine is activated and is exposed to a lean atmosphere at the time of rotation stop of the internal combustion engine, the catalyst is likely to increase the amount of oxygen storage and deteriorate the conversion performance. Deterioration of the conversion performance of the catalyst is likely to cause poor emission after a next start of the internal combustion engine.

A hybrid vehicle of the present disclosure mainly aims to suppress deterioration of the conversion performance of a catalyst in an exhaust emission control device.

In order to achieve the above primary object, the hybrid vehicle of the disclosure is implemented by an aspect described below.

The present disclosure is directed to a hybrid vehicle. The hybrid vehicle including an engine, a motor, and a control device configured to control the engine and the motor. At a time of a request for stopping the engine, when a temperature of a catalyst in an exhaust emission control device mounted in an exhaust system of the engine is equal to or higher than a predetermined temperature, the control device continues fuel injection of the engine until satisfaction of a predetermined condition and stops fuel injection of the engine on satisfaction of the predetermined condition, and when the temperature of the catalyst is lower than the predetermined temperature, the control device immediately stops fuel injection of the engine.

When the temperature of the catalyst in the exhaust emission control device mounted to the exhaust system of the engine is equal to or higher than the predetermined temperature at the time of the request for stopping the engine, the hybrid vehicle of this aspect continues fuel injection of the engine until satisfaction of the predetermined condition and stops fuel injection of the engine on satisfaction of the predetermined condition. The "predetermined temperature" herein denotes a reference value used to determine whether the catalyst in the exhaust emission control device is activated. Such condition suppresses the catalyst from being exposed to a lean atmosphere, suppresses an increase in amount of oxygen storage of the catalyst, and suppresses deterioration of the conversion performance of the catalyst. As a result, this configuration suppresses poor emission after a next start of the engine. When the temperature of the catalyst is lower than the predetermined temperature at the time of the request for stopping the engine, on the other hand, the hybrid vehicle of this aspect immediately stops fuel injection of the engine. This configuration reduces fuel consumption of the engine. In the case where the temperature of the catalyst is lower than the predetermined temperature, even exposure of the catalyst to the lean atmosphere is unlikely to increase the amount of oxygen storage of the catalyst, compared with the case where the temperature of the catalyst is equal to or higher than the predetermined temperature.

DESCRIPTION OF EMBODIMENTS

The following describes aspects of the present disclosure with reference to some embodiments.

Embodiment

Figure 1:
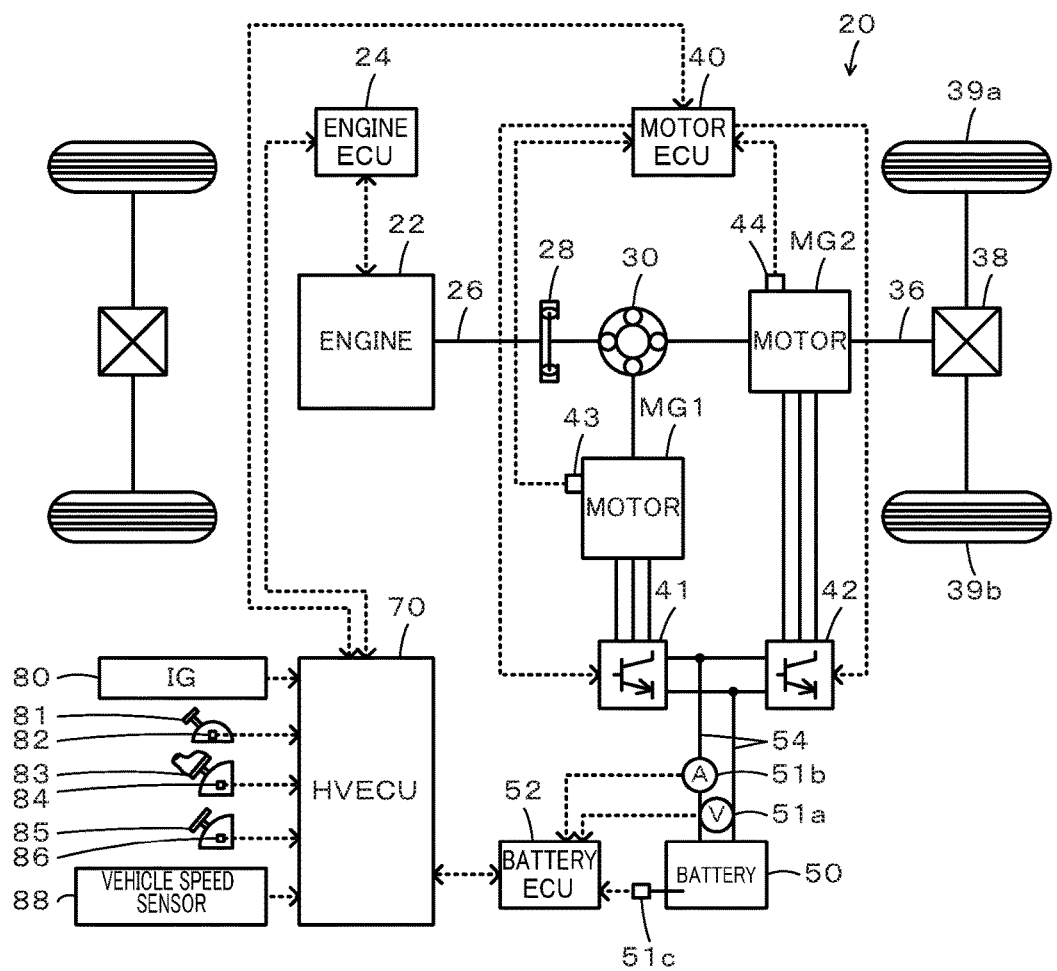
FIG. 1 is a configuration diagram illustrating the schematic configuration of a hybrid vehicle according to one embodiment of the disclosure.
Figure 2:
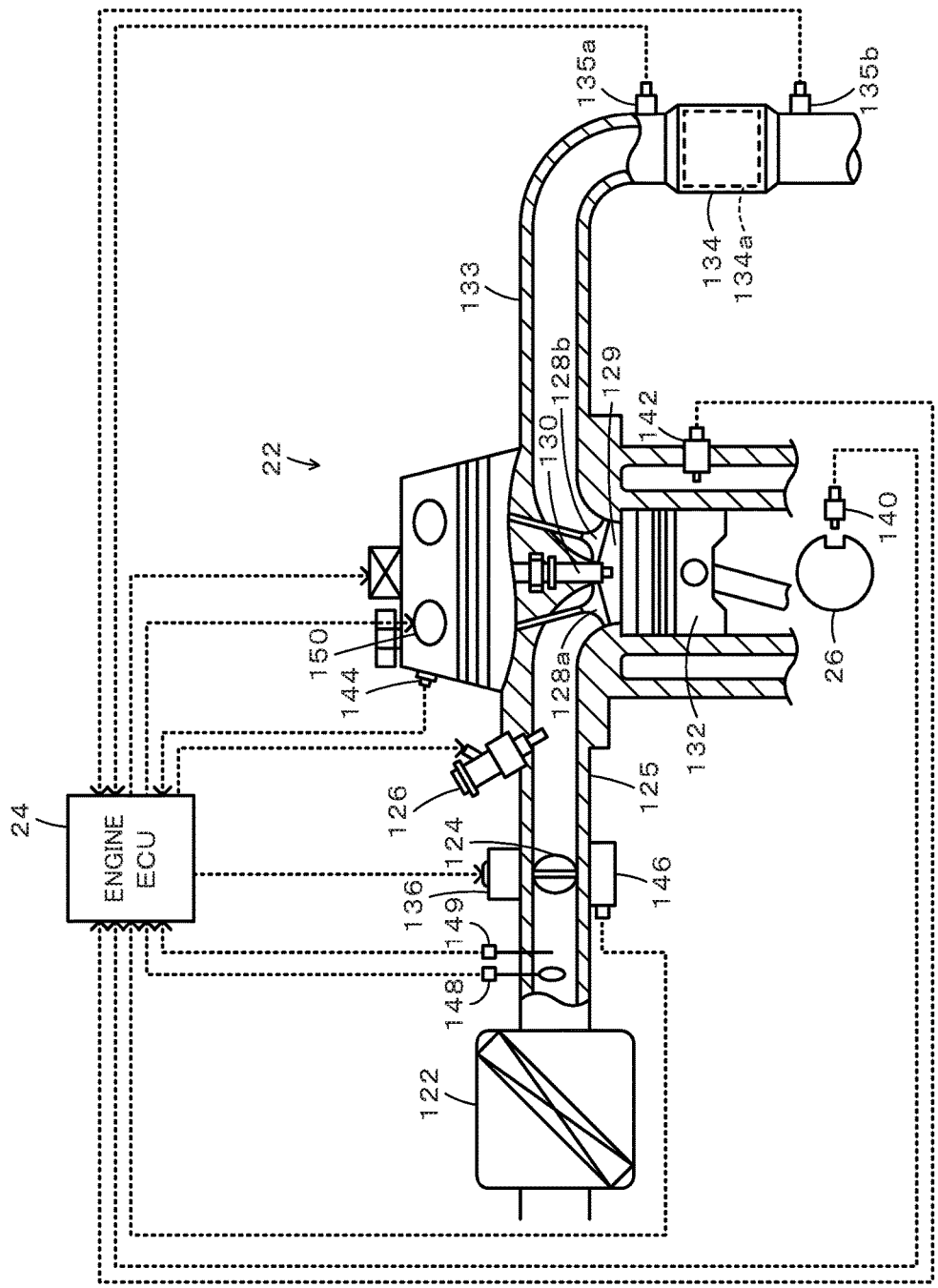
FIG. 2 is a configuration diagram illustrating the schematic configuration of an engine.

FIG. 1 is a configuration diagram illustrating the schematic configuration of a hybrid vehicle 20 according to one embodiment of the disclosure and FIG. 2 is a configuration diagram illustrating the schematic configuration of an engine 22. As illustrated, the hybrid vehicle 20 of the embodiment includes an engine 22, a planetary gear 30, motors MG1 and MG2, inverters 41 and 42, a battery 50 as a power storage device and a hybrid electronic control unit (hereinafter referred to as "HVECU") 70.

The engine 22 is configured as an internal combustion engine that outputs power using a fuel such as gasoline or light oil. As shown in FIG. 2, the engine 22 is configured to mix the air that is cleaned by an air cleaner 122 and that is taken into an intake pipe 125 via a throttle valve 124 with the fuel that is injected from a fuel injection valve 126 and to provide an air-fuel mixture. This air-fuel mixture is taken into a combustion chamber 129 via an intake valve 128a and is explosively combusted with an electric spark provided by a spark plug 130. The engine 22 serves to convert the reciprocating motion of a piston 132 that is pressed down by the energy of the explosive combustion into the rotating motion of a crankshaft 26. The exhaust emission from the combustion chamber 129 to an exhaust pipe 133 via an exhaust valve 128b is discharged to the outside air through an exhaust emission control device 134 that is filled with a catalyst (three-way catalyst) 134a serving to convert toxic components such as carbon monoxide (CO), hydrocarbons (HC) and nitrogen oxides (NOx).

This engine 22 is operated and controlled by an engine electronic control unit (hereinafter referred to as "engine ECU") 24. The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle θcr from a crank position sensor 140 configured to detect the rotational position of the crankshaft 26 and a cooling water temperature Tw from a water temperature sensor 142 configured to detect the temperature of cooling water of the engine 22. The input signals also include cam angles θci and θco from a cam position sensor 144 configured to detect the rotational position of an intake cam shaft that is provided to open and close the intake valve 128a and to detect the rotational position of an exhaust cam shaft that is provided to open and close the exhaust valve 128b. Additionally, the input signals include a throttle position TH from a throttle valve position sensor 146 configured to detect the position of the throttle valve 124, an intake air flow Qa from an air flowmeter 148 mounted to the intake pipe 125, and an intake air temperature Ta from a temperature sensor 149 mounted to the intake pipe 125. Furthermore, the input signals include an air-fuel ratio AF from an air-fuel ratio sensor 135a mounted on an upstream side of the exhaust emission control device 134 in the exhaust pipe 133 and an oxygen signal O2 from an oxygen sensor 135b mounted on a downstream side of the exhaust emission control device 134. Various control signals for operation control of the engine 22 are output from the engine ECU 24 via the output port. The signals output from the engine ECU 24 include, for example, a drive control signal to a throttle motor 136 configured to adjust the position of the throttle valve 124, a drive control signal to the fuel injection valve 126, a drive control signal to the spark plug 130, and a drive control signal to a variable valve timing mechanism 150 configured to change an open/close timing of the intake valve 128a. The engine ECU 24 is connected with the HVECU 70 via the respective communication ports. The engine ECU 24 calculates a rotation speed Ne of the engine 22, based on the crank angle θcr input from the crank position sensor 140. The engine ECU 24 also computes an open-close timing VT of the intake valve 128a, based on an angle difference (θci−θcr) between the cam angle θci of the intake cam shaft input from the cam position sensor 144 and the crank angle θcr input from the crank position sensor 140. Additionally, the engine ECU 24 estimates a temperature Tc of the catalyst 134a (catalyst temperature Tc) in the exhaust emission control device 134, based on the cooling water temperature Tw input from the water temperature sensor 142.

As shown in FIG. 1, the planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are respectively used to drive the motors MG1 and MG2 and are connected with the battery 50 via power lines 54. A motor electronic control unit (hereinafter referred to as "motor ECU") 40 performs switching control of a plurality of switching elements (not shown) included in the respective inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2 and phase currents from current sensors (not shown) configured to detect electric currents flowing in the respective phases of the motors MG1 and MG2 are input into the motor ECU 40 via the input port. The motor ECU 40 outputs via the output port, for example, switching control signals to the plurality of switching elements (not shown) included in the respective inverters 41 and 42. The motor ECU 40 is connected with the HVECU 70 via the respective communication ports. The motor ECU 40 calculates rotation speeds Nm1 and Nm2 of the motors MG1 and MG2, based on the rotational positions θm1 and θm2 of the respective rotors of the motors MG1 and MG2 input from the rotational position detection sensors 43 and 44.

The battery 50 may be configured as, for example, a lithium ion rechargeable battery or a nickel metal hydride battery and is connected with the inverters 41 and 42 via the power lines 54. This battery 50 is under management of a battery electronic control unit (hereinafter referred to as battery ECU) 52.

The battery 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals input from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above.

The hybrid vehicle 20 of the embodiment having the above configuration may be driven in a hybrid drive (HV drive) mode with operation of the engine 22 or in an electric drive (EV drive) mode without operation of the engine 22.

In the HV drive mode, the HVECU 70 sets a required torque Td* that is required for the driveshaft 36, based on the accelerator position Acc and the vehicle speed V, and calculates a required power Pd* that is required for the driveshaft 36 by multiplying the set required torque Td* by a rotation speed Nd of the driveshaft 36 (rotation speed Nm2 of the motor MG2). The HVECU 70 subsequently sets a required power Pe* that is required for the engine 22 by subtracting a required charge-discharge power Pb* of the battery 50 (which takes a positive value when the battery 50 is discharged) based on the state of charge SOC of the battery 50 from the required power Pd*. The HVECU 70 subsequently sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. The engine ECU 24 performs operation control of the engine 22, such that the engine 22 is operated on the basis of the target rotation speed Ne* and the target torque Te*. The control of the engine 22 includes, for example, intake air flow control of controlling the opening position of the throttle valve 124, fuel injection control of controlling the amount of fuel injection from the fuel injection valve 126, ignition control of controlling the ignition timing of the spark plug 130 and open-close timing control of controlling the open-close timing of the intake valve 128a. The motor ECU 40 performs drive control of the motors MG1 and MG2 (i.e., performs switching control of the plurality of switching elements included in the inverters 41 and 42), such that the motors MG1 and MG2 are driven with the torque commands Tm1* and Tm2*.

In the EV drive mode, the HVECU 70 sets the required torque Td* based on the accelerator position Acc and the vehicle speed V, sets the torque command Tm1* of the motor MG1 to value 0, and sets the torque command Tm2* of the motor MG2 such that the required torque Td* is output to the driveshaft 36. The HVECU 70 then sends the torque commands Tm1* and Tm2* of the motors MG1 and MG2 to the motor ECU 40. The motor ECU 40 performs drive control of the motors MG1 and MG2 as described above.

Figure 3:
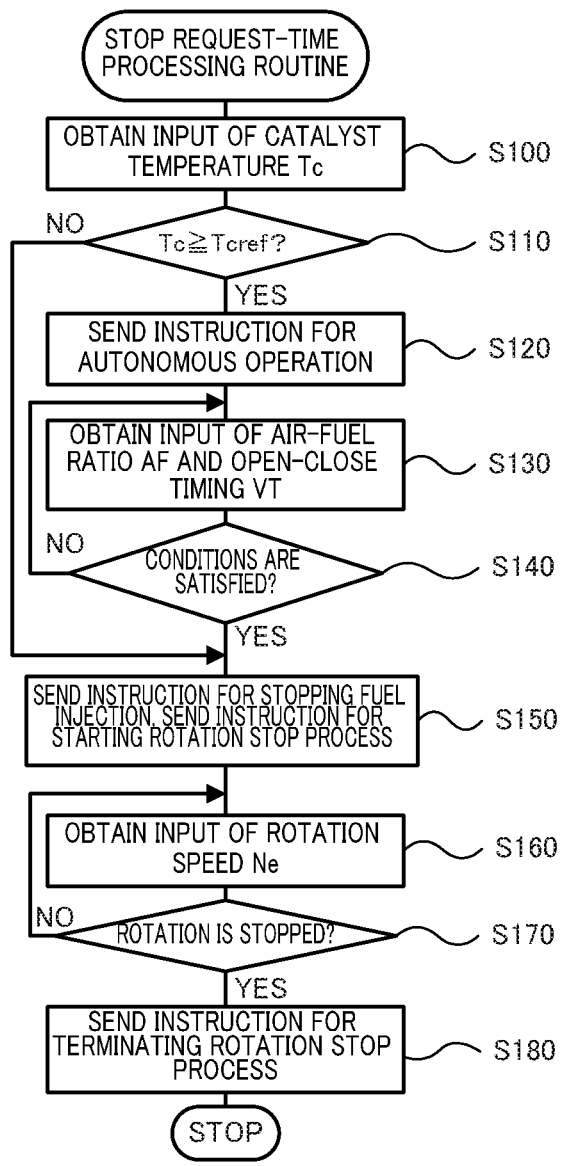
FIG. 3 is a flowchart showing one example of a stop request-time processing routine performed by an HVECU according to the embodiment.

The following describes operations of the hybrid vehicle 20 of the embodiment having the above configuration and more specifically series of operations in response to a request for stopping the engine 22. FIG. 3 is a flowchart showing one example of a stop request-time processing routine performed by an HVECU 70 according to the embodiment. This routine is performed in response to a request for stopping the engine 22. The request for stopping the engine 22 is made, for example, when the required power Pe* decreases to or below a stopping reference value Pstop in the HV drive mode.

When the stop request-time processing routine is triggered, the HVECU 70 first obtains input of the temperature Tc of the catalyst 134a (catalyst temperature Tc) (step S100) and compares the input catalyst temperature Tc with a reference value Tcref (step S110). The catalyst temperature Tc input here is a value that is estimated based on the cooling water temperature Tw input from the water temperature sensor 142 and that is input from the engine ECU 24 by communication. The reference value Tcref is a criterion value used to determine whether the catalyst 134a of the exhaust emission control device 134 is activated or not and may be, for example, 380° C., 400° C. or 420° C.

When the catalyst temperature Tc is equal to or higher than the reference value Tcref, the HVECU 70 determines that the catalyst 134a is activated and sends an instruction for autonomous operation (no-load operation) of the engine 22 to the engine ECU 24 (step S120). When receiving the instruction for autonomous operation of the engine 22, the engine ECU 24 causes the engine 22 to perform autonomous operation with continuing fuel injection of the engine 22, such as to adjust an in-catalyst air-fuel ratio AFc that denotes an air-fuel ratio in the catalyst 134a to a stoichiometric ratio (stoichiometric air-fuel ratio) (i.e., stabilize the in-catalyst air-fuel ratio AF at the stoichiometric ratio), while changing the open-close timing VT of the intake valve 128a to a start timing suitable for a next start of the engine 22 (for example, to a most retarded timing as a latest timing).

The HVECU 70 subsequently obtains input of the in-catalyst air-fuel ratio AFc and the open-close timing VT of the intake valve 128a (step S130). The in-catalyst air-fuel ratio AFc input here is the air-fuel ratio AF that is detected by the air-fuel ratio sensor 135a mounted on the upstream side of the exhaust emission control device 134 in the exhaust pipe 133 and that is input from the engine ECU 24 by communication as the in-catalyst air-fuel ratio AFc. The open-close timing VT of the intake valve 128a input here is a value that is computed based on the crank angle θcr input from the crank position sensor 140 and the cam angle θci of the intake cam shaft input from the cam position sensor 144 and that is input from the engine ECU 24 by communication.

After obtaining the data input, the HVECU 70 determines whether both an air-fuel ratio condition that the in-catalyst air-fuel ratio AFc reaches the stoichiometric ratio (i.e., is stabilized at the stoichiometric ratio) and an open-close timing condition that the open close timing VT of the intake valve 128a reaches the start timing are satisfied (step S140). When it is determined that at least one of the air-fuel ratio condition and the open-close timing condition is not yet satisfied, the HVECU 70 returns to step S130.

Figure 4:
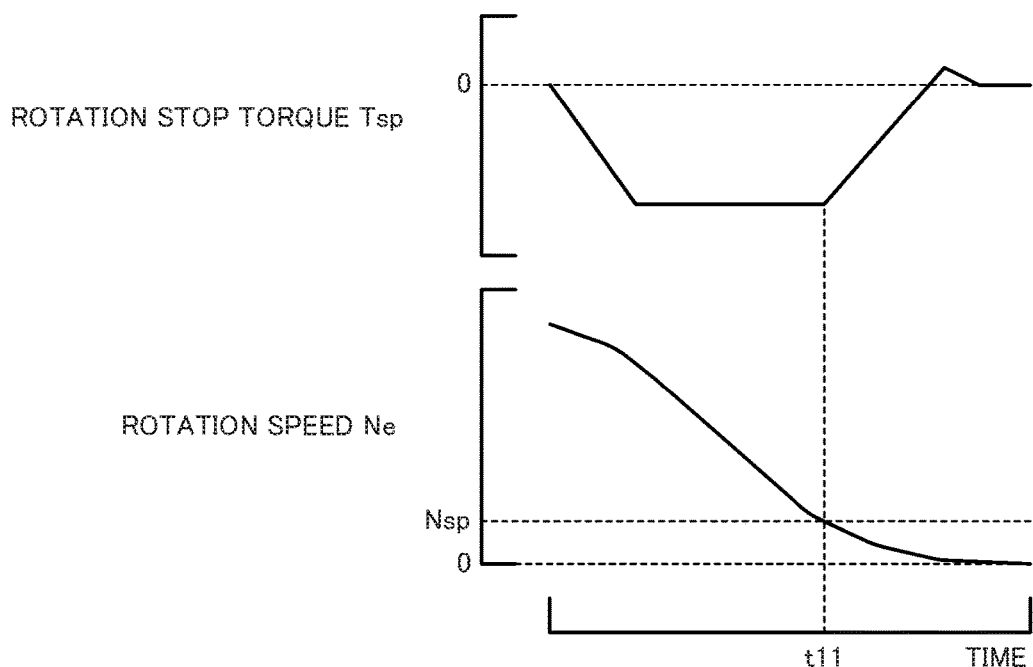
FIG. 4 is a diagram showing a relationship between a rotation stop torque Tsp of a motor MG1 and a rotation speed Ne of the engine.

When it is determined that both the air-fuel ratio condition and the open-close timing condition are satisfied at step S140 as the result of repetition of the processing of steps S130 and S140, the HVECU 70 sends an instruction for stopping fuel injection of the engine 22 to the engine ECU 24, while sending an instruction for starting a rotation stop process by the motor MG1 to the motor ECU 40 (step S150). When receiving the instruction for stopping fuel injection, the engine ECU 24 stops fuel injection of the engine 22. When receiving the instruction for starting the rotation stop process by the motor MG1, the motor ECU 40 performs drive control of the motor MG1, such that the motor MG1 starts outputting a rotation stop torque Tsp for the purpose of stopping rotation of the engine 22. FIG. 4 is a diagram showing a relationship between the rotation stop torque Tsp of the motor MG1 and the rotation speed Ne of the engine 22. According to the embodiment, as illustrated, at the initial time, the rotation stop torque Tsp of the motor MG1 becomes a negative torque of a relatively large absolute value, such that the rotation speed Ne of the engine 22 promptly passes through a resonance area (to suppress the occurrence of vibration). When the rotation speed Ne of the engine 22 becomes equal to or lower than a predetermined rotation speed Nsp that is lower than a lower limit of the resonance area (at time t11), the rotation stop torque Tsp of the motor MG1 becomes a positive torque of a relatively small absolute value and then becomes equal to zero, such that the crank angle θcr of the engine 22 is stopped in a starting range suitable for a next start. The predetermined rotation speed Nsp is determined by experiment or analysis as the rotation speed Ne of the engine 22 to cause the crankshaft 26 of the engine 22 to be subsequently rotated by about 360 degrees C.A and to be stopped and may be, for example, 200 rpm, 250 rpm or 300 rpm.

The HVECU 70 subsequently obtains input of the rotation speed Ne of the engine 22 (step S160) and waits until the input rotation speed Ne of the engine 22 becomes equal to zero (i.e., the engine 22 stops rotation) (step S170). The HVECU 70 then sends an instruction for terminating the rotation stop process by the motor MG1 to the motor ECU 40 (step S180) and terminates this routine.

In the process of stopping rotation of the engine 22, when the catalyst 134*a* is activated and is exposed to a lean atmosphere, the catalyst 134*a* is likely to increase the amount of oxygen storage and deteriorate the conversion performance. Deterioration of the conversion performance of the catalyst 134*a* is likely to cause poor emission after a next start of the engine 22. By taking into account the foregoing, when the catalyst temperature Tc is equal to or higher than the reference value Tcref at the time of the request for stopping the engine 22, the configuration of the embodiment continues fuel injection of the engine 22 until both the air-fuel ratio condition and the open-close timing condition are satisfied. The configuration of the embodiment stops fuel injection of the engine 22 when both the air-fuel ratio condition and the open-close timing condition are satisfied. This suppresses the catalyst 134*a* from being exposed to the lean atmosphere, suppresses an increase in amount of oxygen storage of the catalyst 134*a*, and suppresses deterioration of the conversion performance of the catalyst 134*a*. As a result, this configuration suppresses poor emission after a next start of the engine 22.

Additionally, when fuel injection of the engine 22 is stopped, the motor MG1 outputs the rotation stop torque Tsp. This configuration causes the rotation speed Ne of the engine 22 to promptly pass through the resonance area (to suppress the occurrence of vibration) and causes the crank angle θcr of the engine 22 to be stopped in the starting range.

When the catalyst temperature Tc is lower than the reference value Tcref at step S110, on the other hand, the HVECU 70 determines that the catalyst 134*a* is not activated, performs the processing of steps S150 to S180 with skipping the processing of steps S120 to S140, and terminates this routine. Accordingly, when the catalyst 134*a* is not activated at the time of the request for stopping the engine 22, the configuration of the embodiment immediately stops fuel injection of the engine 22. This reduces fuel consumption of the engine 22. When the catalyst 134*a* is not activated, even exposure of the catalyst 134*a* to the lean atmosphere is unlikely to increase the amount of oxygen storage of the catalyst 134*a*. In this case, in response to the request for stopping the engine 22, the procedure of the embodiment immediately stops fuel injection of the engine 22 and causes the motor MG1 to start outputting the rotation stop torque Tsp. A change of the open-close timing VT of the intake valve 128*a* to the start timing should thus be completed before the engine 22 stops rotation.

As described above, when the catalyst temperature Tc is equal to or higher than the reference value Tcref at the time of the request for stopping the engine 22, the hybrid vehicle 20 of the embodiment continues fuel injection of the engine 22 until both the air-fuel ratio condition and the open-close timing condition are satisfied. The hybrid vehicle 20 of the embodiment stops fuel injection of the engine 22 when both the air-fuel ratio condition and the open-close timing condition are satisfied. This suppresses the catalyst 134*a* from being exposed to the lean atmosphere, suppresses an increase in amount of oxygen storage of the catalyst 134*a*, and suppresses deterioration of the conversion performance of the catalyst 134*a*. As a result, this configuration suppresses poor emission after a next start of the engine 22. When the catalyst temperature Tc is lower than the reference value Tcref at the time of the request for stopping the engine 22, on the other hand, the hybrid vehicle 20 of the embodiment immediately stops fuel injection of the engine 22. This reduces fuel consumption of the engine 22. When the catalyst 134*a* is not activated, even exposure of the catalyst 134*a* to the lean atmosphere is unlikely to increase the amount of oxygen storage of the catalyst 134*a*.

The hybrid vehicle 20 of the embodiment is configured to stop fuel injection of the engine 22 after the request for stopping the engine 22 and to cause the motor MG1 to start outputting the rotation stop torque Tsp. A modification may not cause the motor MG1 to start outputting the rotation stop torque Tsp. In this modification, the rotation speed Ne of the engine 22 is decreases by the friction, and the engine 22 stops rotation.

When the catalyst temperature Tc is equal to or higher than the reference value Tcref at the time of the request for stopping the engine 22, the hybrid vehicle 20 of the embodiment continues fuel injection of the engine 22 until both the air-fuel ratio condition and the open-close timing condition are satisfied. A modification may not use the open-close timing condition and may continue fuel injection of the engine 22 until the air-fuel ratio condition is satisfied. In this modification, a change of the open-close timing VT of the intake valve 128*a* to the start timing should be completed before the engine 22 stops rotation. Instead of using the air-fuel ratio condition and the open-close timing condition, another modification may continue fuel injection of the engine 22 until elapse of a predetermined time period. The "predetermined time period" may be, for example, a time period estimated to be required until satisfaction of the air-fuel ratio condition (for example, 400 msec, 500 msec or 600 msec).

When the catalyst temperature Tc is lower than the reference value Tcref at the time of the request for stopping the engine 22, the hybrid vehicle 20 of the embodiment immediately stops fuel injection of the engine 22 and causes the motor MG1 to start outputting the rotation stop torque Tsp. A modification may immediately stop fuel injection of the engine 22 but may cause the motor MG1 to output a holding torque Thd for rotating the engine 22 at a predetermined rotation speed (for example, 900 rpm, 1000 rpm or 1100 rpm) until satisfaction of the open-close timing condition described above, while causing the motor MG1 to start outputting the rotation stop torque Tsp on satisfaction of the open-close timing condition.

In the hybrid vehicle 20 of the embodiment, the temperature Tc of the catalyst 134a (catalyst temperature Tc) in the exhaust emission control device 134 is an estimated value on the basis of the cooling water temperature Tw of the engine 22. According to a modification, however, the temperature Tc of the catalyst 134a may be a value detected by a temperature sensor provided in the exhaust emission control device 134 to detect the temperature Tc of the catalyst 134a.

The hybrid vehicle 20 of the embodiment uses the battery 50 as the power storage device. The power storage device may, however, be any device configured to accumulate electricity, for example, a capacitor.

The hybrid vehicle 20 of the embodiment includes the engine ECU 24, the motor ECU 40, the battery ECU 52 and the HVECU 70. At least two of these may, however, be configured as a single electronic control unit.

Figure 5:
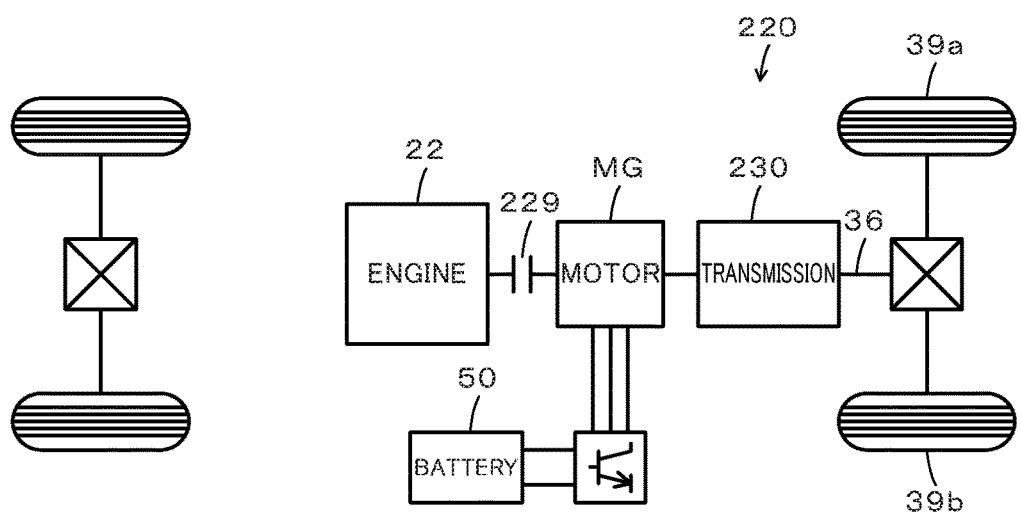
FIG. 5 is a configuration diagram illustrating the schematic configuration of another hybrid vehicle according to a modification.

The hybrid vehicle 20 of the embodiment is configured such that the engine 22 and the motor MG1 are connected via the planetary gear 30 with the driveshaft 36 that is coupled with the drive wheels 39a and 39b and that the motor MG2 is connected with the driveshaft 36. As shown in FIG. 5, however, a hybrid vehicle 220 of a modification may be configured such that a motor MG is connected via a transmission 230 with a driveshaft 36 that is coupled with drive wheels 39a and 39b and that an engine 22 is connected via a clutch 229 with the motor MG.

In the hybrid vehicle of the above aspect, the motor may be connected with an output shaft of the engine, and when stopping fuel injection of the engine, the control device may control the motor to reduce a rotation speed of the engine. This configuration enables the rotation speed of the engine to promptly pass through a resonance area.

In the hybrid vehicle of the above aspect, the predetermined condition may include an air-fuel ratio condition that an air-fuel ratio in the catalyst reaches a stoichiometric ratio. This suppresses the catalyst from being exposed to a lean atmosphere when the temperature of the catalyst is equal to or higher than the predetermined temperature. In this case, the engine may include a variable valve timing mechanism configured to change an open-close timing of an intake valve, and the predetermined condition may include an open-close timing condition that an open-close timing of the intake valve reaches a predetermined timing, in addition to the air-fuel ratio condition.

Furthermore, in the hybrid vehicle of the above aspect, the predetermined condition further may include a time condition that a predetermined time has elapsed. The "predetermined time period" used may be a time period estimated to be required until satisfaction of the air-fuel ratio condition.

In addition, in the hybrid vehicle of the above aspect, the temperature of the catalyst may be detected by a temperature sensor mounted to the exhaust emission control device or may be estimated based on temperature of cooling water of the engine.

The following describes the correspondence relationship between the primary elements of the above embodiment and the primary elements of the disclosure described in Summary. The engine 22 of the embodiment corresponds to the "engine", the motor MG1 corresponds to the "motor", and the HVECU 70, engine ECU 24 and motor ECU 40 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles

The invention claimed is:

1. A hybrid vehicle comprising an engine, a motor, and a control device configured to control the engine and the motor, wherein
    at a time of a request for stopping the engine,
    when a temperature of a catalyst in an exhaust emission control device mounted in an exhaust system of the engine is equal to or higher than a predetermined temperature, the control device performs an autonomous operation of continuing fuel injection of the engine until a predetermined condition is satisfied in which an air-fuel ratio in the catalyst reaches a stoichiometric ratio and stops fuel injection of the engine on satisfaction of the predetermined condition, and
    when the temperature of the catalyst is lower than the predetermined temperature, the control device immediately stops fuel injection of the engine.

2. The hybrid vehicle according to claim 1,
    wherein the motor is connected with an output shaft of the engine, and
    when stopping fuel injection of the engine, the control device controls the motor to reduce a rotation speed of the engine.

3. The hybrid vehicle according to claim 2,
    wherein the predetermined condition includes a time condition that a predetermined time has elapsed.

4. The hybrid vehicle according to claim 1,
    wherein the engine includes a variable valve timing mechanism configured to change an open-close timing of an intake valve, and
    the predetermined condition includes an open-close timing condition that an open-close timing of the intake valve reaches a predetermined timing, in addition to the air-fuel ratio condition.

5. The hybrid vehicle according to claim 1,
wherein the temperature of the catalyst is detected by a temperature sensor mounted to the exhaust emission control device or is estimated based on temperature of cooling water of the engine.

\* \* \* \* \*